United States Patent [19]

Nathan et al.

[11] Patent Number: 5,485,196
[45] Date of Patent: Jan. 16, 1996

[54] SECURE INTERACTIVE PROGRAM DISTRIBUTION CONTROL FOR TELEDISTRIBUTION NETWORK

[75] Inventors: Guy E. Nathan, Yerres; Simon Elkaim, Paris, both of France

[73] Assignee: Lyonnaise Communications, Paris, France

[21] Appl. No.: 93,303

[22] Filed: Jul. 14, 1993

Related U.S. Application Data

[63] Continuation of Ser. No. 773,662, Oct. 24, 1991, abandoned.

[30]     Foreign Application Priority Data

Oct. 10, 1988 [FR] France ........................... 88 13261

[51] Int. Cl.⁶ .................................................. H04N 7/10
[52] U.S. Cl. .................. 348/7; 348/10; 455/4.2; 455/6.2
[58] Field of Search ................ 455/4.1, 4.2, 5.1, 455/6.2, 151.2; 343/702; 333/167; 348/6, 7, 10, 11

[56]            References Cited

U.S. PATENT DOCUMENTS

| 3,934,079 | 1/1976 | Barnhart | 358/86 |
|---|---|---|---|
| 4,451,803 | 5/1984 | Holdsworth et al. | 337/167 |
| 4,475,123 | 10/1984 | Dumbauld et al. | 358/114 |
| 4,512,033 | 4/1985 | Schrock | 455/2 |
| 4,611,213 | 9/1986 | Johnson et al. | 343/702 |
| 4,673,976 | 6/1987 | Wreford-Howard | 358/10 |
| 4,891,694 | 1/1990 | Way | 455/4.2 |
| 5,001,554 | 3/1991 | Johnson et al. | 358/86 |

Primary Examiner—Edward F. Urban
Attorney, Agent, or Firm—Nixon & Vanderhye

[57]            ABSTRACT

An interactive arborescent architecture teledistribution network includes an exchange controlling the transmission of television programs, images and sound programs and a wide band source for transmitting all these programs. A user differentiating circuit box is used as well as a circuit to interrogate the user differentiating circuit box, a circuit to transmit a program request from the user for the exchange once the box of the user has been addressed by the exchange, circuits in the exchange for generating a validation signal in response to the request, and circuits disposed in the user differentiating circuit box so as to select a program from all the programs transmitted according to the validation signal. The user differentiating circuit box is preferably disposed on the arborescent architecture between the exchange and the television receiver of the user.

40 Claims, 7 Drawing Sheets

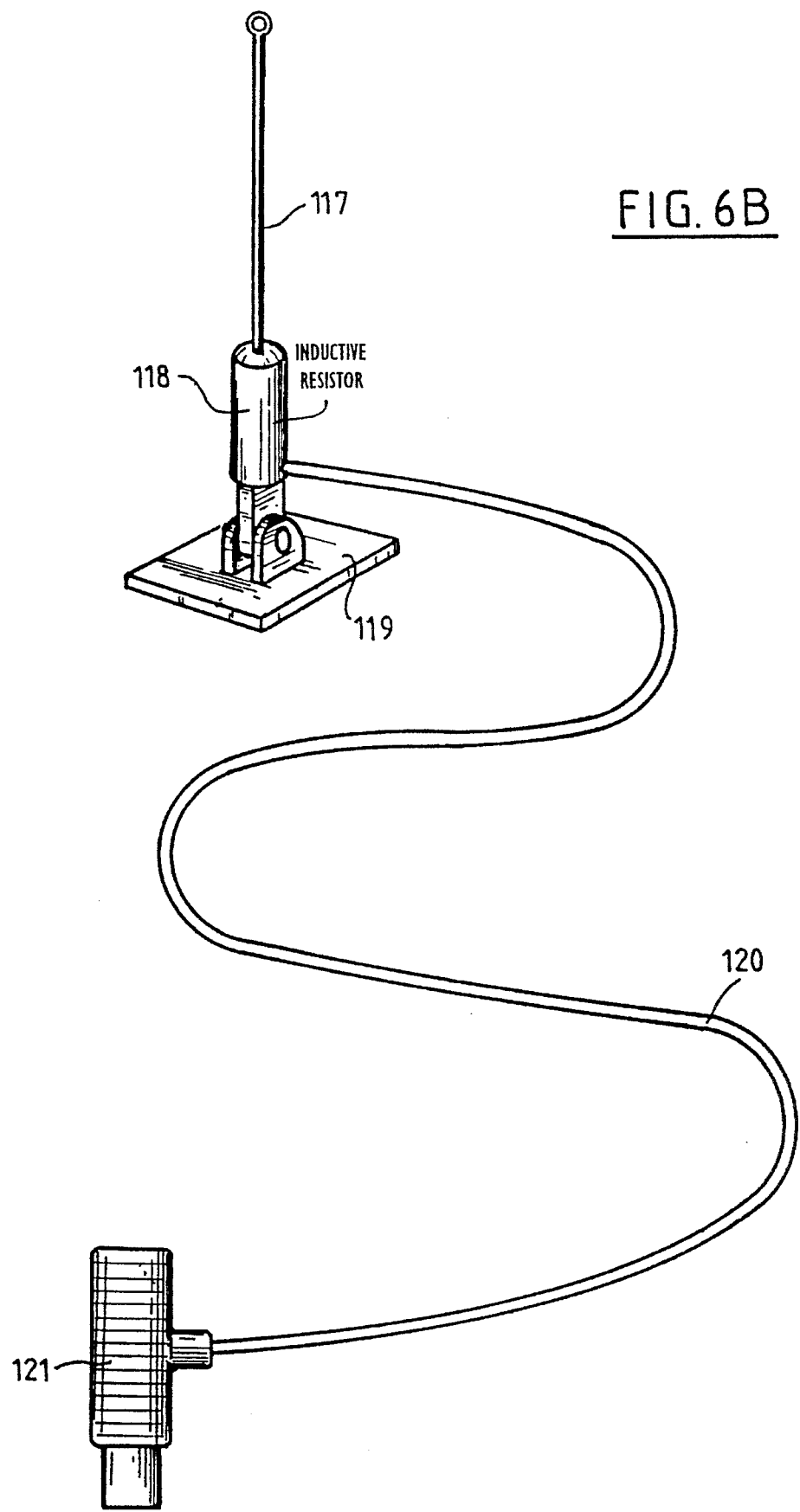

5,485,196

SECURE INTERACTIVE PROGRAM DISTRIBUTION CONTROL FOR TELEDISTRIBUTION NETWORK

This is a continuation of application Ser. No. 07/773,662, filed Oct. 24, 1991, now abandoned.

FIELD OF THE INVENTION

The present invention concerns an interactive arborescent architecture teledistribution network and is able to be used in television cable networks.

BACKGROUND OF THE INVENTION

In the prior art, there already exists a type of teledistribution network adapted to the cable transmission of television broadcasts or programs. But up until now, the devices of the prior art did not have any interactivity characteristic, in other words the capacity for the host exchange to know precisely what each network customer requires for his installation.

In these circumstances, it is still impossible, or at least not with means accessible to the public market, of real time controlling and managing such a network guaranteeing its inviolability.

One distinct advantage of the present invention is to make it possible to embody a low cost network for distributing cable paying television programs adapted both to small networks comprising a small number of subscribers and to networks extended to cover an entire town.

SUMMARY OF THE INVENTION

In fact, the present invention concerns an interactive arborescent architecture network of the type comprising a exchange in which control of the distribution of television programs, images and sound programs and a support for broadcasting all these programs is effected.

In particular, the invention is characterized in that the network includes at each user a distribution box comprising:
  foolproof means to identify any fraud perpetrated by the user,
  means to transmit a user program request to the exchange once the user differentiating circuit box has been addressed by the exchange,
  means in the exchange to control a condition for validating the request,
  means disposed in the user differentiating circuit box so as to select a program from all the programs distributed according to the result of control of the validation condition,
the user differentiating circuit box being disposed on the transmission cable between the exchange and the television receiver.

BRIEF DESCRIPTION OF THE DRAWINGS

Other characteristics and advantages of the present invention shall be more readily understood from a reading of the description and with the aid of the drawings on which.

DETAILED DESCRIPTION OF THE PREFERRED EMBODIMENTS

Figure 1:
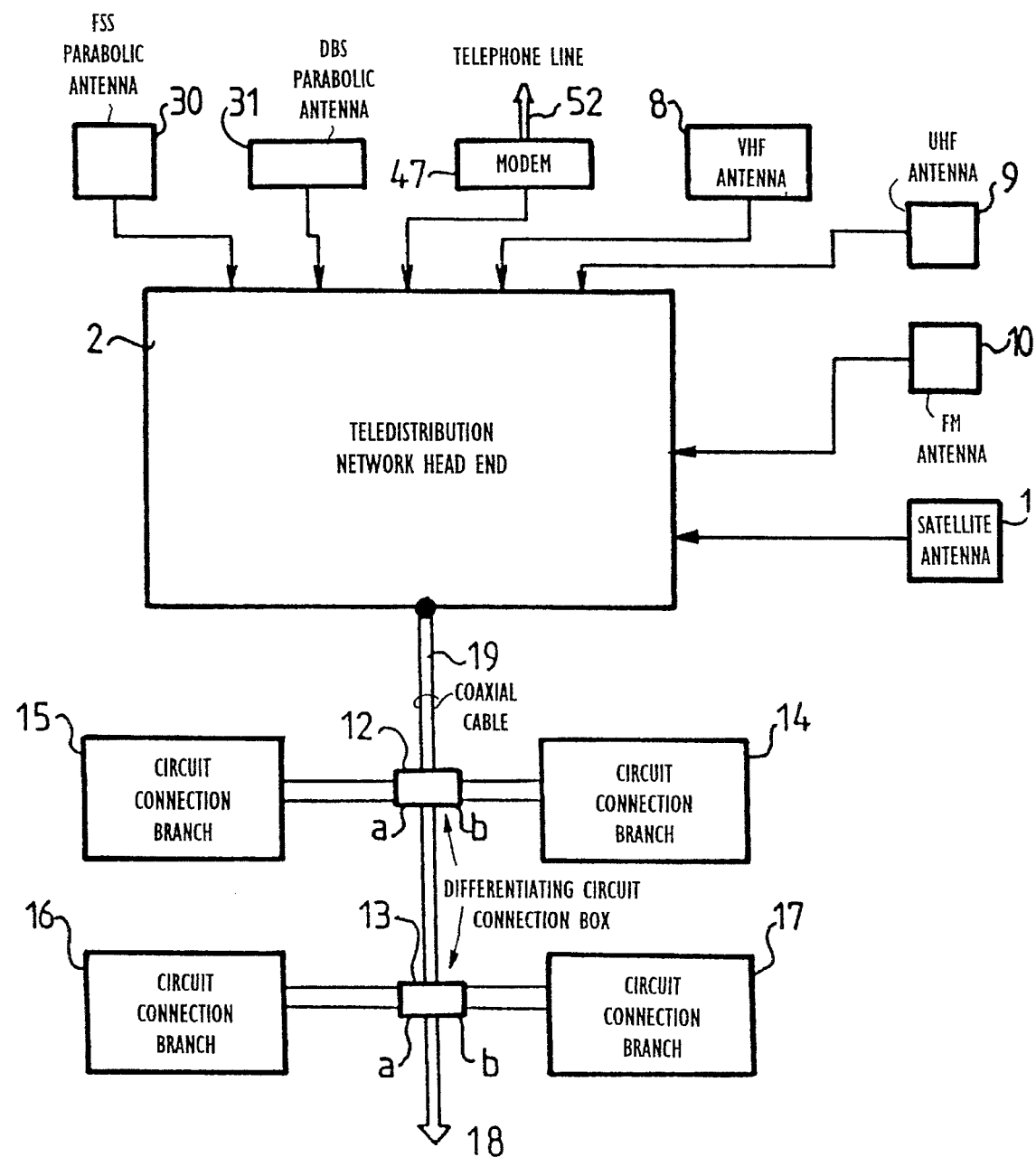
FIG. 1: a diagram of the general architecture of the network of the invention.

FIG. 1 shows a network conforming to the invention. Such a network comprises program receivers or more specifically emissions physically constituted by modulated signals. In one particular case, the invention is able to manage a television reception antenna via satellite 1 and VHF 8, UHF 9 and FM 10 land emission reception antennae.

According to another embodiment of the invention, other signal sources are also used. These are signals derived from monitoring cameras and those derived from video recorders.

All the signals, suitably reshaped as shall be seen subsequently, are transmitted onto a coaxial cable (19) in the form of a multiplexed signal with several bearers. An arborescent network is connected to this cable (19) via the bias of the differentiating circuit boxes (12, 13, etc).

Each outlet a or b of a differentiating circuit box is the access point of a circuit connection branch (14, 15, 16, 17, etc). Each circuit connection branch corresponds in one embodiment to the cabling of 8 users. In this embodiment example, each circuit connection branch comprises 8 users, as shall be seen subsequently on FIG. 2, and the cable (19) bears 32 branch circuit connection boxes, such as the box (14). Accordingly, this amounts to a total of 256 served users.

Figure 2:
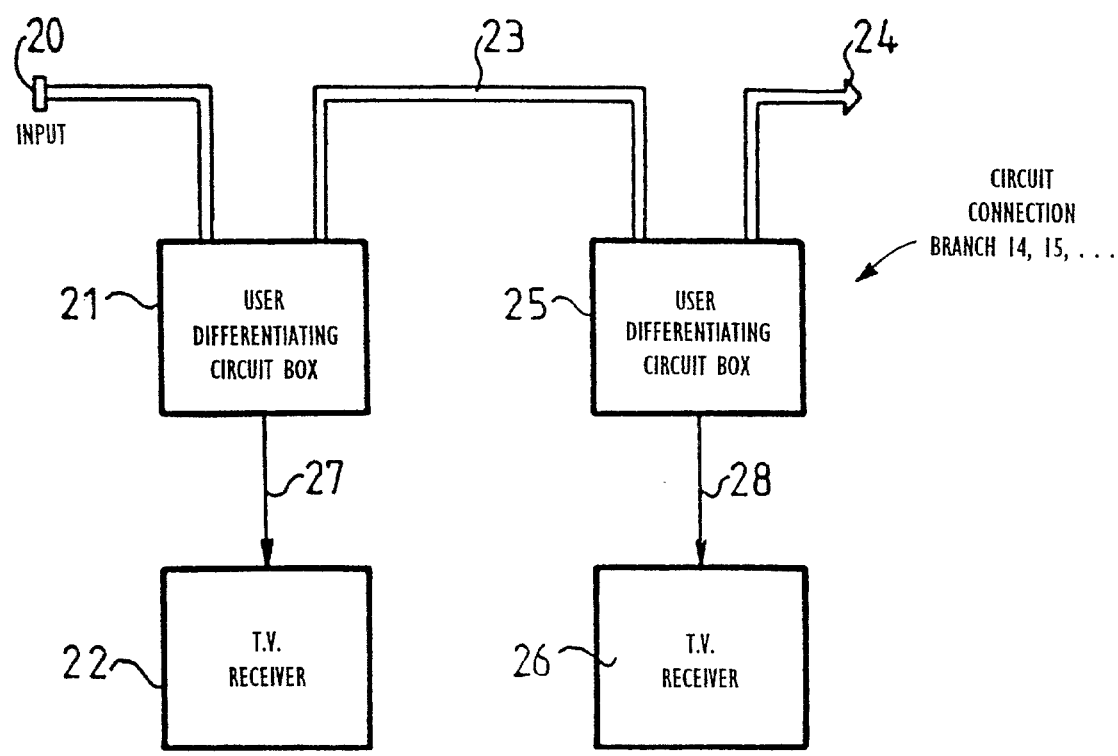
FIG. 2: a diagram of one portion of an arborescent network conforming to the invention.

FIG. 2 shows one of the circuit connection branches (14 to 17). This branch comprises an input (20) connected directly to the terminal a or b of a circuit connection box (12) or (13). The coaxial cable, which comes out, enters onto a user differentiating circuit box (21) which, as shall be seen subsequently, makes it possible to draw up and direct under certain conditions a signal (27) towards a television receiver (22) able to be activated by the user.

A coaxial cable (23) comes out of the user differentiating circuit box (21), this cable then being connected to a user differentiating circuit box (25), itself connected to a second television receiver station (26) for a second user. A coaxial cable (24) makes it possible to follow up the branch.

Figure 3:
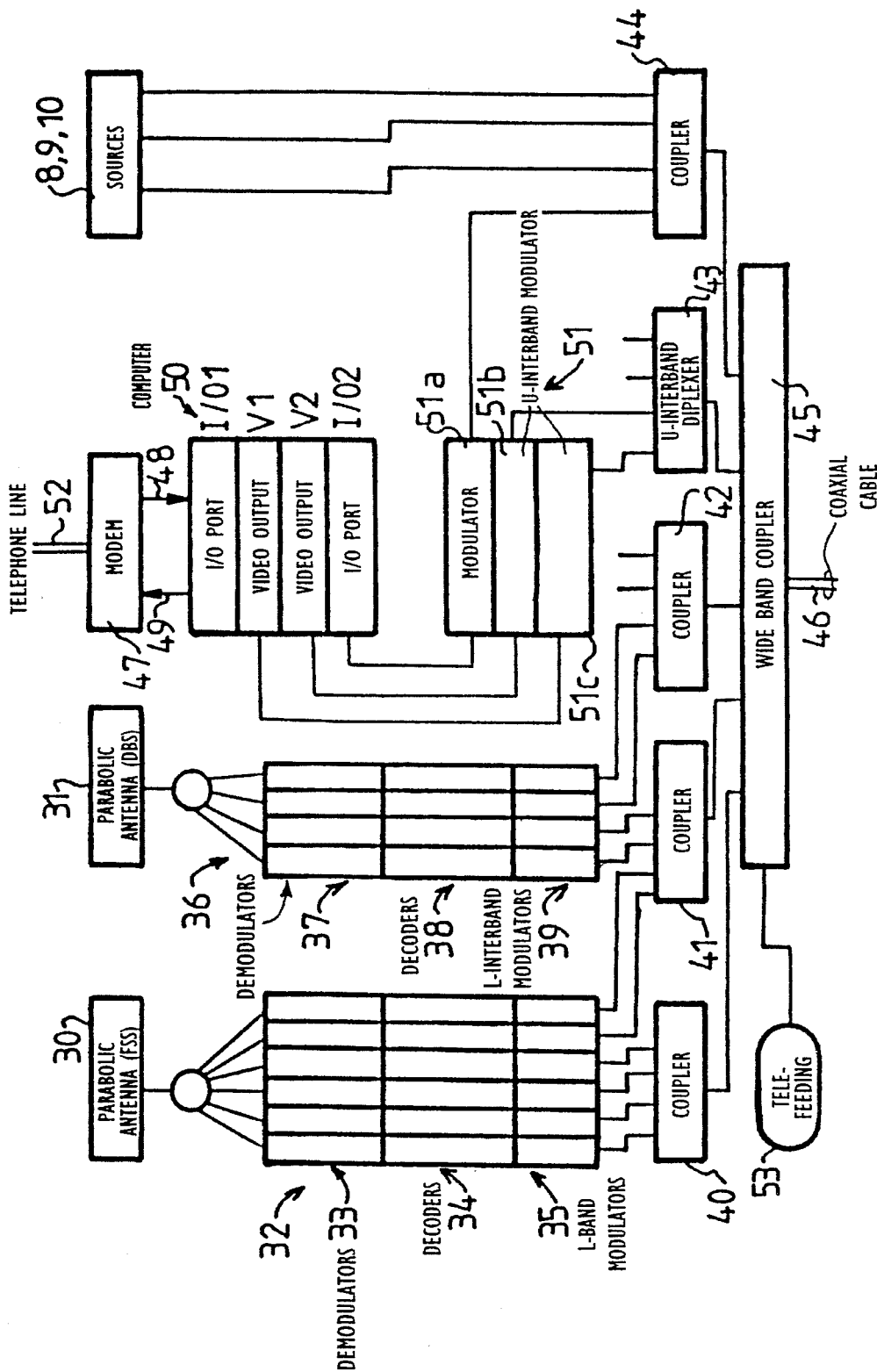
FIG. 3: a diagram of the exchange according to the invention.

FIG. 3 illustrates the functioning of a exchange used in the invention. This exchange comprises a first processing level able to embody a multibearer multiplex.

In the network of the invention, in one preferred embodiment, the input members are successively parabolic FSS (Fixed Satellite Service Band) type antenna to receive geostationary satellite transmissions or DBS (Direct Broadcasting Satellite) type transmissions.

The figure then shows a demodulator/modulator circuit known as a modem connected through a computer to a telephone line. It enables the exchange to be connected to the outside world.

Finally, the figure shows conventional UHF and VHF land hertzien television antennae, as well as frequency modulation FM transmissions inside the band II.

The parabolic antennae 30 and 31 are then connected onto demodulator batteries specialized in frequency signals exceeding one Gigahertz. This more particularly concerns transferring those signals representative of the programs to frequencies compatible with requirements allowing for transmission onto a coaxial cable.

In the embodiment example, 10 channels for the "L" band and 10 others in the "U" band and 2 channels in the low band are disposed in these bands, known by the CCIR as interbands, namely a total of 22 channels. 0n FIG. 3, 8 "L" band channels, 4 "U" bands channels and 4 low band (known as "S") channels are used, namely a total of 16 channels making it possible to transport 16 programs simultaneously, without counting those of the normal VHF and UHF bands.

According to the embodiment shown on FIG. 3, 10 processing columns are combined divided into two groups (32) and (36) according to the origin (30) or (31) of the signal to be processed. In the group (32), the input signal is separated into 6 signals via demodulation tuned onto the desired transmissions by 6 demodulators (33). Then 6 decoders (34) and 6 "L" interband modulators (35) are used.

A coupler from the "L" interband band (40) makes it possible to regroup 4 first signals and the next two are supplied to a second coupler (41) of the same type.

The signal of the DBS antenna (31) is sent onto a second processing group (36) comprising the same elements as the first group (32), that is demodulators (37), decoders (38) and finally "L" interband modulators (39).

The first two signals derived from this second group (36) are sent to the "L" band coupler (41) and the next two to the next coupler (42).

Then a telephone line (52) is connected to a modem or a modulator/demodulator circuit (47). This circuit operates on one first I/01 input/output port of a computer (50), for example based on an IBM PC standard Intel 8086 microprocessor card.

The computer also has two video outputs (V1) and (V2) used to transmit to the network up to two programs of synthetic images or composite screens. A second port (I/02) makes it possible to exchange the data with a modulator circuit (51a) able to exchange data inside a low interband. On receiving, the circuit (51a) is also a demodulator circuit enabling the computer to exploit request signals emanating from users and the various interactive devices of the invention.

The outputs (V1) and (V2) are supplied to "U" interband modulators (51b) and (51c) and the signals derived from them are supplied to a second "U" interband diplexer (43).

In the connection shown on FIG. 3, it can be seen that two channels are free on each of the two "U" interband couplers. They are reserved for special usages, such as video programs from the exchange.

Finally, the various VHF (8), UHF (9) and FM (10) sources are directly coupled onto the following coupler (44).

The outputs of the 5 aforesaid couplers (40, 41, 42, 43, 44) are supplied to the inputs of a wide band coupler (45) which makes it possible to route inside the cable (46) a signal with 16 carrier waves jammed onto specific frequencies inside the interbands, all the VHF, UHF and FM land carrier waves and to transmit control signals to be described subsequently.

A telefeeding device (53) makes it possible to provide the energy required for the various items of equipment disposed on the network and shall be explained subsequently in detail.

Other signal transporting means may replace the coaxial cable (46). In particular, it is possible to use an optical fiber cable. Technicians in this field are familiar with the adaptation circuits.

Figure 4:
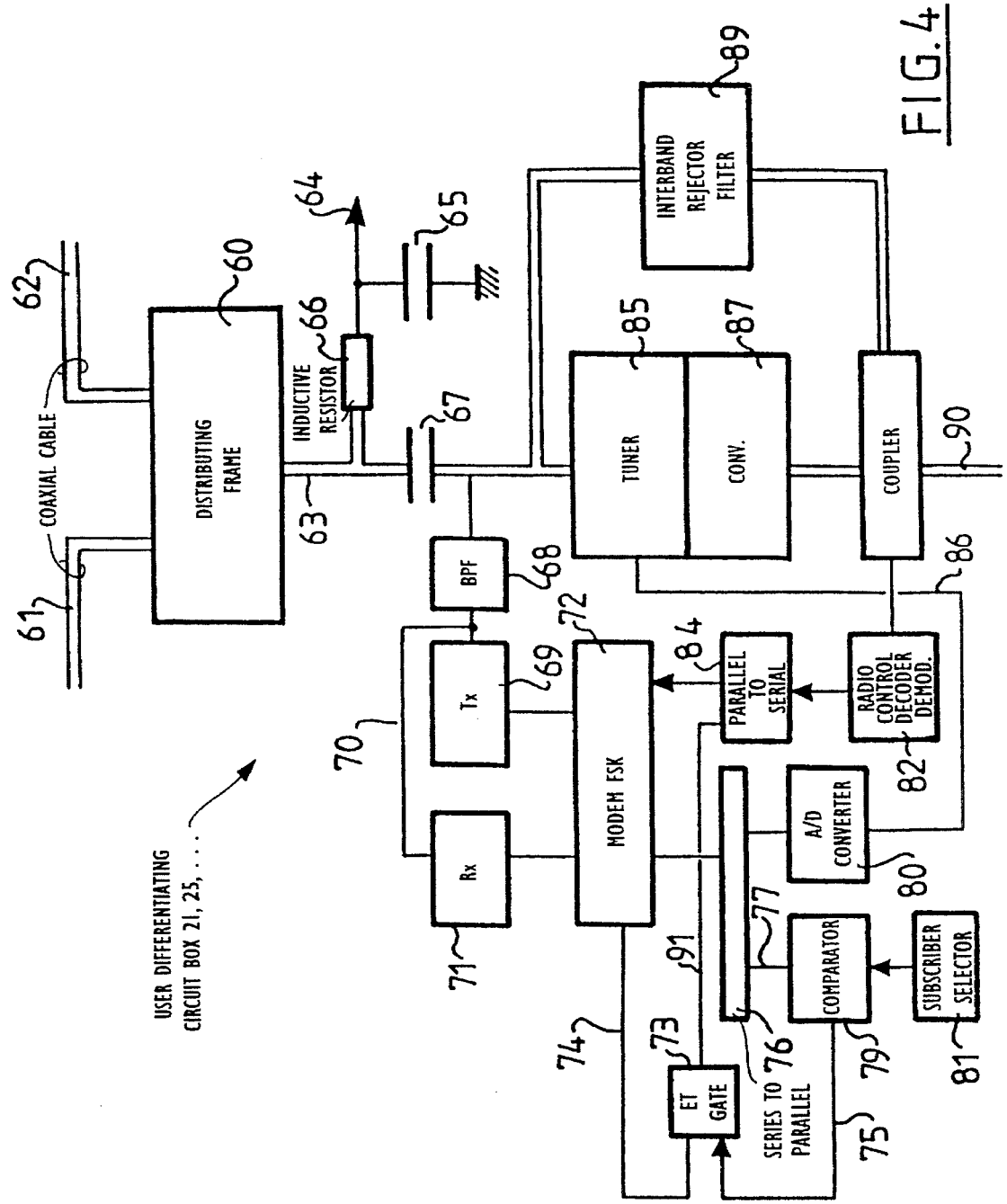
FIG. 4: a diagram representing a user differentiating circuit box conforming to the invention.

FIG. 4 shows a user differentiating circuit box. This box corresponds to one of the boxes (21) or (25) of FIG. 2. It makes it possible to selectively connect the user television set to the converter/tuner making it possible to transpose a carrier frequency selected from the interband frequencies into a television band frequency, namely band I, band III, band IV and V.

The subscriber differentiating circuit box thus comprises a first coaxial cable (61) which brings the complete wide spectrum from the exchange transported on the coaxial cable. A second coaxial cable (62) makes it possible to transfer the entire spectrum to the next user differentiating circuit boxes of the branch. A third coaxial cable (63) makes it possible to move the wide band spectrum to the processing circuits described below. The three coaxial cables are connected onto a distributing frame (60).

The coaxial cable (63) is firstly connected to a device able to separate telefeeding of the signal borne by the cable from the exchange.

This device comprises a d.c. voltage extractor constituted by one inductive resistor (66) and one capacitor (65). The terminal (64) makes it possible to feed all the circuits of the differentiating circuit box and thus ensure interactive selectivity according to the invention, to be described now in detail.

The wide band signal freed of the d.c. voltage by means of the capacitor (67) of course contains the three bands, known as the "L", "U" and low interbands described above, but also the conventional land radio and television bands. So as to allow for direct transfer to the television receiver of the land bands without undergoing tariff verification and validations of the device of the invention, an interband band rejector filter (89) is disposed, which has the effect of the conventional bands and programs of being available on the television via its coaxial input fed by the coaxial cable 90.

The wide band signal is firstly filtered by a bandpass filter (68) which also plays a role on emission, as shall be seen later. The output of the filter 68 is then transmitted to a demodulator receiving circuit (71) whose output feeds the receiving input of a demodulator/modulator circuit known as a modem (72).

In the preferred embodiment of the invention, the modem is a FSK (Frequency Shift Keying) type modem according to which the "1" and "0" bits are coded by a set of oscillations on two distinct characteristic frequencies.

The differentiating circuit box of the invention also comprises a radiocontrol decoder/demodulator (82). The coaxial cable (90) transits a carrier modulated around 300 MHz which is demodulated and decoded by the circuit (82). This circuit enables the user to select via a radiocontrol described hereafter the chain or program he wishes to receive. The radiocontrol decoder/demodulator (82) provides a 4 bit word code serialized by the circuit (84) and transmitted to the emission input of the FSK modem (72).

Figure 6A:
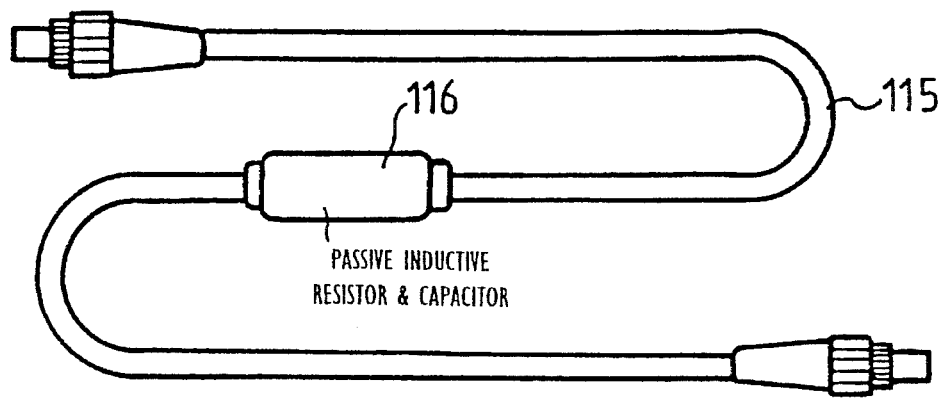
Figure 6C:
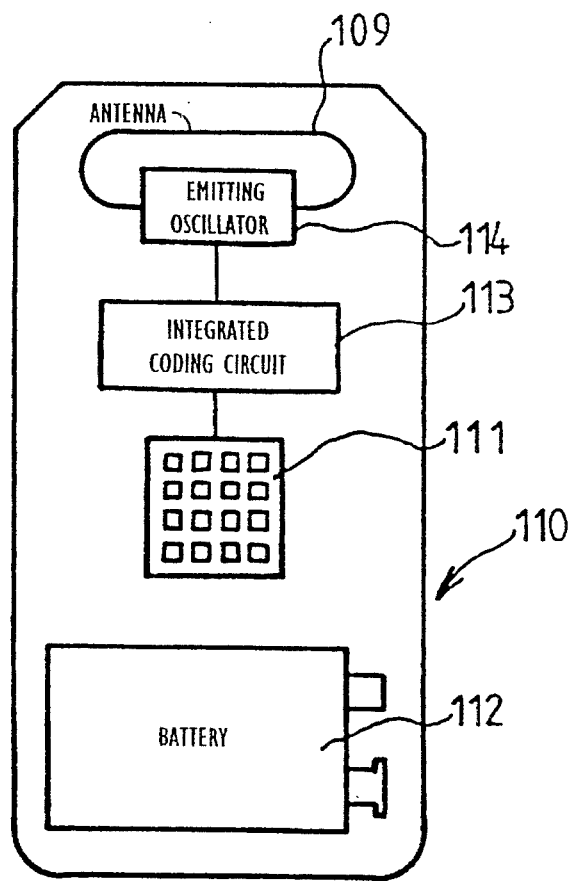

The radiocontrol shown on FIG. 6C is constituted by a box (110) fitted with 16 keys (111), a battery (112), a printed circuit comprising an integrated coding circuit (113) and an emitting oscillator (114) modulated by the signals derived from the coding circuit. The oscillator (114) sends out rays with the aid of an antenna (109) etched on the printed circuit within a radius of several meters. This radiation is captured by one of the two variants of FIGS. 6A or 6B. The first variant is constituted by a coaxial type connecting cord (115) on which a passive circuit (116) is disposed constituted by an inductive resistor and a capacitor tuned onto the radiocontrol emission frequency.

The second variant is constituted by a whip type antenna (117) associated with an inductive resistor (118) making it possible to tune the unit onto the radiocontrol frequency. Thus unit (117, 118) is mounted pivoting on a pressure sensitive base (119). The inductive resistor (118) is connected to a coaxial cable (120) at the end of which a male/female connector (121) is situated and acts as a coupler. The male portion is connected directly to the antenna input of the television receiver and the female portion is connected to the output (90) of the user differentiating circuit box. It is to be noted that, with this method, no active sensitive equipment is installed at the premises of the user, which avoids the possibility of fraud occuring and thus reduces installation costs. In particular, the user differentiating circuit does not have to be located at the premises of the user.

The emission signal of the modem (72) is then modulated on a carrier wave of 72 Mhz by an emitting circuit (69) and injected onto the distributing frame 60) by the coaxial cable (63) successively through the bandpass filter (68) and the capacitor (67).

However, this emission is only possible when a short duration temporal window is validated on a control (91) derived from an ET gate (73), as shall be seen subsequently.

In the case where the request signal is emitted onto the exchange by the coaxial cable (61) and then the main coaxial cable of the arborescent network as far as the wide band coupler (45) of FIG. 3, this is taken into account by the coupler (44) and acknowledged by the demodulator (51a). This in fact is a computer interface.

This interface comprises an FSK modem of the same type as (72) whose frequencies are F1 and F2 for the "0" and "1" bits on emission, and F3 and F4 for the "0" and "1" bits on receiving. On receiving, the modem provides the I/O input of the computer 50 with a word of series bits to be decoded in a management program of the interactive network.

When the management software of the network requires a program connection, the modulator of the circuit (51a) emits a series of bits which of course transit onto the various coaxial cables (46) of FIG. 3 and then (61) and (62) of FIG. 4. This message is available for all the differentiating circuit boxes of the arborescent network.

In the preferred embodiment, the message is a serial word of 12 bits with 8 bits corresponding to the address of the user and 4 bits corresponding to the program number imposed at a given moment.

In the user differentiating circuit box of FIG. 4, the word of 12 series bits received transitted onto the coaxial cable 63 is transmitted by the bandpass filter (68) and supplied to the demodulator receiver (71) which delivers the FSK modulation signal to the modem (72).

The modem 72 then emits a series of 12 bits to a series/parallel transformer (76) whose output is a bus of 12 lines whose 8 small weights are supplied to a first input (77) of a bit-by-bit comparator (79) and the 4 heavier bits supplied to a suitably calibrated analog/digital converter (80).

The programmed voltages are then sent to a tuner (85) which makes it possible to tune the carrier wave selected which is then sent to a converter (87). Tuning is conventionally obtained mainly with the aid of a varicap or capacity diode whose polarization voltage is the tuning voltage of the tuner. Thus, in the interbands transiting on the coaxial cable (63), it is possible to select the program corresponding to the user request if the latter is validated.

However, the comparator (79) which receives on its first input the 8 bit word corresponding to the address of the user to be served comprises a second input connected to a subscriber selector 81. This circuit mainly comprises microcontacts installed in a given position when the user differentiating circuit box is installed. The positioning of microcontacts establishes the subscriber number. If the number corresponds to that of the word applied to the first input (77) of the comparator (79), the output (75) of the comparator then passes to the active "1" state.

At the end of receiving the 12 bit message, the output (74) of the modem (72) passes to the top "1" state if the modem is in the emission position. Then the output of the ET gate (73) passes to level "1" authorizing granting of the parallel series conversion of the subscriber request in the circuit (84) towards the emission input of the modem (72) and thus its transmission to the exchange, as described earlier.

The computer of the exchange comprises a user management software. If it acknowledges that the user number just emitted has the right to receive the channel he demands, the computer then validates the demand. It transmits the 4 bit word required during a second cycle which is thus decoded by the converter 80 and authorizes reception of the program required by the user.

If the computer does not acknowledge that the user number allows it to honor his request, then in the second cycle the computer does not validate the request and requires according to the same procedure the use of another 4 bit word differing from the one required by the user. This 4 bit word corresponds to the tuning voltage on the tuner (85) which makes it possible to receive one of the service channels (V1) or (V2) of the computer generating an image of alphanumeric characters composed of a message advising the user that his request cannot be honored, for a particular reason.

In particular, the user could not be a subscriber for receiving this program and a message thus passed to him invites him to become a subscriber by informing him of the procedure to be followed.

It is to be noted that there is no direct link between the means for expressing the request of the subscriber and the selection circuit of the program of the tuner/converter 85, 87. All the requests must strictly transit through the computer, thus avoiding any possibility of fraud.

Similarly, there is a further advantage of the invention in that it is impossible to embody a coupling of the differentiating circuit box. In fact, all the requests are centralized in the computer, thus preventing the possibility of fraud.

Furthermore, the interactivity intervenes by the fact that a request corresponds to a response from the computer.

Figure 5:
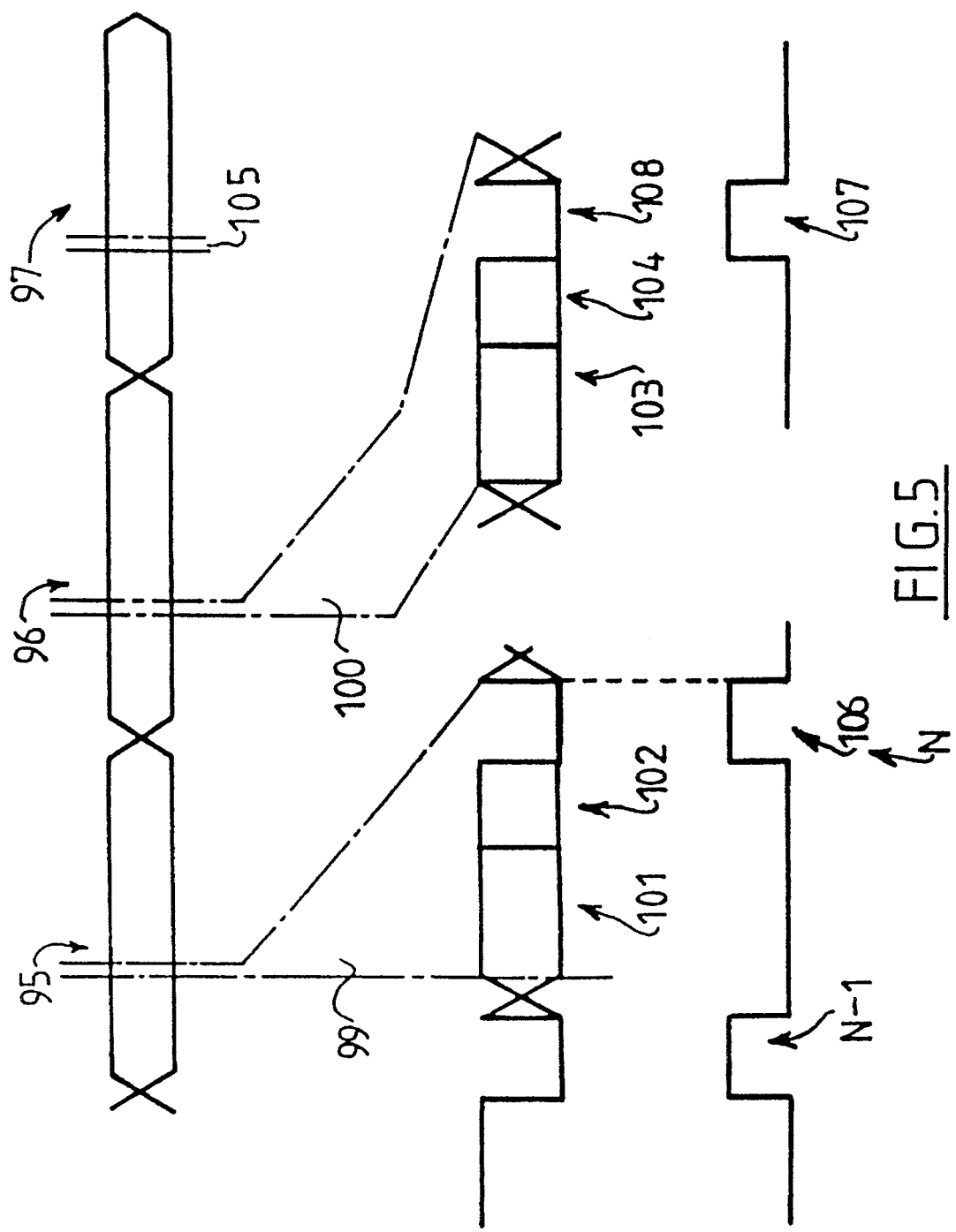
FIG. 5: a timing diagram explaining the interactivity of the network, FIGS. 6A, 6B and 6C representing the diagram and elements ensuring radiocontrol.

FIG. 5 shows the mode of dialogue which embodies the interactivity of the network of the invention.

On the service channel, the control and request signal, suitably modulated into a low interband band, transits onto the main coaxial cable of the arborescent network and reaches all the distribution boxes of the network. This signal comprises an uninterrupted succession of frame pairs.

In the case of a network of 256 subscribers with 16 programs to be distributed, 8 bits are required to address each subscriber and 4 bits to correctly identify a program. It is clear that the invention is fully suitable for larger or smaller numbers. In particular, the identifier of a subscriber (hereafter his address) or that of a program (hereafter his number) may be a vector. In the case of a subscriber. identifier, the latter may comprise a first element corresponding to the address of the branch of the arborescent network, such as the branches 14, 15, 16 or 17 of FIG. 2.

This is then the number of the output (a) or (b) of the differentiating circuit box (12) or (13) according to the example of FIG. 2.

A second element is then the address of the distribution box in the branch identified by the first element. Such a solution is admissible, as well as a coding of the identifiers as explained earlier, and a reprogramming of their value on the initiative of the exchange computer.

The references (95, 96, 97) each represent a set of 256 interrogation and response cycles managed by the computer (50). The management protocol of the cable network uses a set of 256 interrogation signals immediately followed by a response of the addressed user differentiating circuit box. Thus, the reference (99) represents the sequence of exchange between the computer (50) by the channel (51a) with a given user differentiating circuit box (N). At the start of this exchange sequence (99), the computer (50) sends an interrogation frame of 12 bits (101, 102) comprising in the field (101) 8 address bits making it possible to address one of the 256 boxes and in the field (102) 4 data bits which in an initial phase for interrogating the box (N) are positioned at zero. These two fields (101, 102) are immediately followed by placing the computer in receiving mode for a period of time corresponding to receiving the 4 bits (106) representing the selection of one of the remote-distributed channels required by the user. Upon initialization of the system, the computer receives "0000" and controls on the validation sequence (90) of the differentiating circuit box (N) the validation of the service channel for example, by emitting the data "0000" in the zone (102). In the case where for the differentiating circuit box of the user (N) the response signal is "0101" following the last radiocontrolled selection, the computer sends to the address of the box (N) the "0101" data in the data field (102) of the frame. This field (102) is followed by a hold field for receiving by the computer of the response signal (106) derived from the user differentiating circuit box. The response signal (106) could be identical to that of the preceding sequence in the event of non-modification of the selection and change following the selection of another channel. In this latter case, the new selection transmitted in the response (106) shall be validated by the management software of the network on the next sequence (100). The management software of the interactive network takes into account the selection requests as follows.

There are two cases involved. The management software of the interactive network has acknowledged that the user is clearly a subscriber (more generally an authorized person) and then the voltage (86) delivered by the link between the analog/digital converter (80) and the tuner (85) corresponds to tuning of a signal authorizing reception of the televised progam demanded by the user.

The user is not acknowledged as an authorized person, at least for the program requested and then the voltage 86 delivers via the control link on the converter tuner (85, 87) the tuning of a signal transmitting a notification program informing the user that he is not authorized to receive this program. This notification program is generated by the computer 50 on channel V1 or V2.

It is to be noted that the duration of a cycle for a conventional asynchronous linking flowrate of 9600 bits/sec is, for words of 12 bits plus 4 validated bits, is less than one second. This means that in the preferred embodiment example, the request of the user is satisfactory in less than one second, which is is suitable for most applications.

Additional protection against fraud consists of counting for a given user the number of requests the exchange can honor. When this number exceeds a threshold figure (3 repeats in the preferred example), then an alarm indicates the coordinates of the fraudulent user known via the address of the interrogation signal and the nature of the fraud perpetrated. A possible fraudulent user thus has only 3 seconds to perpetrate his fraud.

In the preferred embodiment example, the distribution box at the premises of the user is sealed with lead.

A suitable software makes it possible to embody listening statistics and to provide a billing on listening time or for the number of programs. To this end, the equality condition is maintained as long as the request has not changed in the central computer, the converter (80) of the user differentiating circuit box comprising a device for memorizing the validated request as long as the latter does not change. To this end, the converter is completed at the input by a sweep circuit which memorizes the request and renders it permanent. As this circuit is familiar to experts in this field, it is not described here in detail.

Another advantage of the invention is to allow for self-diagnosis. In fact, if there is any anomaly in the response of at least one of the user differential circuit boxes, the microcomputer, knowing the address emitted to interrogate the box, could by means of an additional software represent the distribution network and feature in a different representation mode the differentiating circuit box(es) for which an abnormal response has been received.

Furthermore, as each microcomputer for managing a local network may be connected by telecommunications means with a central site regrouping all the information derived from the various local networks, it is possible to also provide at the required level (microcomputer or central site) means to carry out a zoom in the representation diagram so as to obtain additional information.

Other modifications within the range of experts in this field also form part of the invention.

What is claimed is:

1. An interactive arborescent architecture teledistribution network of the type comprising an exchange controlling the distribution of television programs, images and sound programs and a wide band support for transmitting all said program via a user differentiating circuit box unit, said network comprising:

means to interrogate said user differentiating circuit box, means to transmit a user programs request to the exchange once the user box has been addressed by the exchange, means in the exchange to generate a validation signal in response to the request, means disposed in the user differentiating box for selecting a program from all the distributed programs according to the validation signal, the user differentiating box being disposed on the arborescent architecture between the exchange and a television receiver at the premises of the user, wherein the exchange includes a computer connected to a modem for managing a service channel emitting in temporal windows the identification codes of the user differentiating boxes in a first frame cut into as many temporal windows as there are addressable users, a temporal window comprising emission by the computer of the number of the interrogated user and then reception of the subsequent request of the user, the first frame being followed by a second frame with an identical structure for validating any one of the windows comprising the emission of the address and then emission of a signal for validating one of the selected program, wherein the user differentiating box is acknowledged as addressed during the first frame emitted by the exchange computer where there is equality by comparing decoding of the identifier code received with the value of the code contained in the device for memorizing the user differentiating box, a validation signal validating transmission of the code memorized by a modem circuit of the user differentiation box so as to emit a request on the service channel of the network to the exchange with the aim of asking the exchange to provide a particular programs, and wherein the user expresses his request by issuing a code by a radio command decoded by a reception circuit connected to a serializer circuit, the reception and serializer circuits being disposed inside the user differentiating box, the code of the request being serialized solely if the address emitted by the exchange is identical to the identifier memorized in the user differentiating box and if the end of reception of a given address word is detected by the modem.

2. Network according to claim 1, wherein the exchange computer then processes the request of the addressed user during the first frame and emits a signal for validating the program relating to the result of the comparison between the request and a verification of the authorized capacity of the requesting user.

3. Network according to claim 1, wherein, from those programs distributed by the exchange, the exchange computer emits at least one program of images intended to inform the user of refusal of the exchange to allow his request.

4. Network according to claim 1, wherein the exchange computer emits during a second frame on the service channel a sequence during which each user differentiating box is addressed at least once in a temporal window comprising a first series of bits representing the identifier of the user followed by a second series of bits representing the value of a validation signal in response to the user request expressed during the first frame.

5. Network according to claim 4, wherein the user differentiating box comprises a device for receiving the value of the validation signal connected to a device for selecting a program borne on the arborescent network.

6. Network according to claim 5, wherein the reception device comprises a demodulator connected to a serial-parallel converter and a digital/analog converter for controlling tuning of the program associated with this validation signal.

7. Network according to claim 5, wherein the tuner/converter for tuning the program associated with this validation signal comprises an analog/digital converter which generates a voltage for tuning an interband tuner/converter connected between the input of the user differentiating box and the television receiver of the user.

8. Network according to claim 1, wherein it also comprises in parallel with the above-mentioned means a filter for rejecting bands reserved for programs accessible to the requests of the user so that the other programs may be directly received by the user on his receiver, irrespective of the circumstances.

9. Network according to claim 1, wherein it comprises a tuned passive circuit disposed on a coaxial extension piece.

10. Network according to claim 1, wherein it comprises a tuned antenna and an inductive resistor connected to a coaxial male/female connector acting as a coupler and connected to the antenna by a coaxial cable.

11. Network according to claim 10, wherein the inductive antenna unit is mounted pivoting on a base comprising fixing means.

12. Network according to claim 9, wherein the control box includes a keypad, a decoding circuit and an emitting oscillator circuit modulated by the signals derived from the coding circuit and a radiant tuned element etched on a printed circuit.

13. An interactive arborescent architecture teledistribution network comprising:

a master terminal controlling the distribution of television programs, images and sound programs to a plurality of remote user differentiating stations, each remote station being connected on one side to the master terminal and on the other side to a tuned passive circuit disposed on a coaxial cable connected to a TV receiver, said tuned passive circuit being tuned to receive modulated signals emitted by a remote circuit control box on actuation of a keypad of the remote circuit control box by a user to express his request for a given TV program, said modulated signal being transmitted through the coaxial cable to decoding means of the remote station and transmitting means for transmitting said request to said master terminal which includes means for processing said request and means for emitting a signal for validating the program as the result of the comparison between the request and a verification of the programs authorized in access for a given user.

14. An interactive arborescent architecture teledistribution network comprising:

a master terminal controlling the distribution of television programs, images and sound programs to a plurality of remote user differentiating stations, each remote station being connected on one side to the master terminal and on the other side connected to a coaxial male-female connector acting as a coupler between a coaxial cable connected to a TV receiver and a tuned antenna associated with an inductive resistor, said tuned antenna being tuned to receive modulated signals emitted by a remote circuit control box on actuation of a keypad of the remote circuit control box by a user to express his request for a given TV program, said modulated signal being transmitted through the coaxial cable to decoding means of the remote station and transmitting means for transmitting said request to said master terminal which includes means for processing said request and means for emitting a signal for validating the program as the result of the comparison between the request and a verification of the programs authorized in access for a given user.

15. A network according to claim 13 or 14 wherein the control box includes a keypad, a coding circuit and an emitting oscillator circuit modulated by the signals derived from the coding circuit and a radiant tuned element etched on a printed circuit.

16. A network according to claim 13 or 14 wherein the network comprises a device for the remote feeding of operating power to the arborescent network disposed in the exchange and which feeds operating power to the network distribution boxes.

17. A network according to claim 13 or 14 wherein, from those programs distributed by the exchange, the exchange computer emits at least one program of images intended to inform the user of refusal of the exchange to allow his request.

18. A network according to claim 13 or 14 of the type comprising an exchange controlling the distribution of television programs, images and sound programs and a wide band support for transmitting all said programs via a user differentiating circuit box unit, said network comprising:
   means to interrogate said user differentiating circuit box,
   means to transmit a user program request to the exchange once the user box has been addressed by the exchange,
   means in the exchange to generate a validation signal in response to the request,
   means disposed in the user differentiating box for selecting a program from all the distributed programs according to the validation signal, the user differentiating box being disposed on the arborescent architecture between the exchange and a television receiver at the premises of the user.

19. A network according to claim 18 wherein the means to interrogate a user differentiating box comprise a device for memorizing and comparing the identification of the user in the arborescence of the network.

20. A network according to claim 19 wherein the address comprises a first element corresponding to one branch of the arborescence and one second element corresponding to the address of the distribution box in said branch.

21. A network according to claim 18 wherein the exchange comprises a computer connected to a modem for managing a service channel emitting in temporal windows the identification codes of the user differentiating boxes in a first frame cut into as many temporal windows as there are addressable users, a temporal window comprising emission by the computer of the number of the interrogated user and then reception of the subsequent request of the user, the first frame being followed by a second frame with an identical structure for validating any one of the windows comprising the emission of the address and then emission of a signal for validating one of the selected programs.

22. A network according to claim 21 wherein the user differentiating box is acknowledged as addressed during the first frame emitted by the exchange computer where there is equality by comparing decoding of the identifier code received with the value of the code contained in the device for memorizing the user differentiating box, a validation signal validating transmission of the code memorized by a modem circuit of the user differentiating box so as to emit a request on the service channel of the network to the exchange with the aim of asking the exchange to provide a particular program.

23. A network according to claim 22 wherein the user expresses his request by issuing a code by a radio command decoded by a reception circuit connected to a serializer circuit, the reception and serializer circuits being disposed inside the user differentiating box, the code of the request being serialized solely if the address emitted by the exchange is identical to the identifier memorized in the user differentiating box and if the end of reception of a given address word is detected by the modem.

24. A network according to claim 23 wherein the exchange computer processes the request of the addressed user during the first frame and emits a signal for validating the program relating to the result of the comparison between the request and a verification of the authorized capacity of the requesting user.

25. A network according to claim 23 wherein the exchange computer emits during a second frame on the service channel a sequence during which each user differentiating box is addressed at least once in a temporal window comprising a first series of bits representing the identifier on the user followed by a second series of bits representing the value of a validation signal in response to the user request expressed during the first frame.

26. A network according to claim 25 wherein the user differentiating box comprises a device for receiving the value of the validation signal connected to a device for selecting a program borne on the arborescent network.

27. A network according to claim 26 wherein the reception device comprises a demodulator connected to a serial-parallel converter and a digital/analog converter for controlling tuning of the program associated with this validation signal.

28. A network according to claim 26 wherein the tuner/converter for tuning the program associated with this validation signal comprises an analog/digital converter which generates a voltage for tuning an interband tuner/converter connected between the input of the user differentiating box and the television receiver of the user.

29. A network according to claim 21 wherein each user differentiating box comprises a device for maintaining the request which is reinitialized via the drawing up of the new request.

30. A network according to claim 13 or 14 further comprising a filter for rejecting bands reserved for programs accessible to requests of the user so that other programs may be directly received by the user on his receiver.

31. A network according to claim 13 or 14 wherein at least one user differentiating box comprises a device for extracting operating power from the network.

32. A network according to claim 14 wherein the tuned antenna unit is pivotably mounted on a base comprising fixing means.

33. An interactive arborescent architecture teledistribution network of the type comprising an exchange controlling the distribution of television programs, images and sound programs and a wide band support for transmitting all said program via a user differentiating circuit box unit, said network comprising:
   means to identify said user differentiating circuit box,
   means to transmit a user program request to the exchange once the user box has been addressed by the exchange,
   means in the exchange to generate a validation signal in response to the request,
   means disposed in the user differentiating box for selecting a program from all the distributed programs according to the validation signal, the user differentiating box being disposed on the arborescent architecture between the exchange and a television receiver at the premises of the user,
   wherein the exchange includes a computer connected to a modem for managing a service channel emitting toward a user differentiating box which emits a request on the service channel of the network to the exchange with the aim of asking the exchange to provide a particular program, and
   wherein the user expresses his request by issuing a code by a radio command decoded by a reception circuit connected to a serializer circuit, the reception and serializer circuits being disposed inside the user differentiating box.

34. Network according to claim 33, wherein the exchange computer then processes the request of he addressed user during the first frame and emits a signal for validating the program relating to the result of the comparison between the request and a verification of the authorized capacity of the requesting user.

35. Network according to claim 33, wherein, from those programs distributed by the exchange, the exchange computer emits at least one program of images intended to inform the user of refusal of the exchange to allow his request.

36. Network according to claim 33, wherein the exchange computer emits during a second frame on the service channel a sequence during which each user differentiating box is addressed at least once in a temporal window comprising a first series of bits representing the identifier of the user followed by a second series of bits representing the value of a validation signal in response to the user request expressed during the first frame.

37. Network according to claim 36, wherein the user differentiating box comprises a device for receiving the value of the validation signal connected to a device for selecting a program borne on the arborescent network.

38. Network according to claim 37, wherein the reception device comprises a demodulator connected to a serial-parallel converter and a digital/analog converter for controlling tuning of the program associated with this validation signal.

39. Network according to claim 37, wherein the tuner/converter for tuning the program associated with this validation signal comprises an analog/digital converter which generates a voltage for tuning an interband tuner/converter connected between the input of the user differentiating box and the television receiver of the user.

40. Network according to claim 33, wherein it also comprises in parallel with the above-mentioned means a filter for rejecting bands reserved for programs accessible to the requests of the user so that the other programs may be directly received by the user on his receiver, irrespective of the circumstances.

* * * * *